Dec. 15, 1959    B. B. NEWBURGER    2,917,251
SPOOLS FOR PHOTOGRAPHIC FILM
Filed Feb. 25, 1955
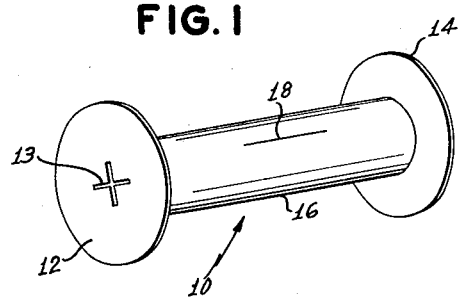
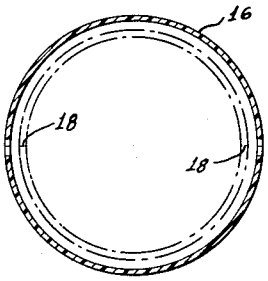
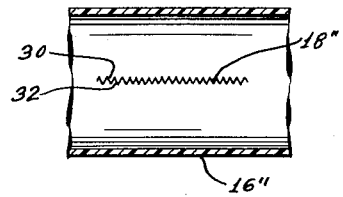
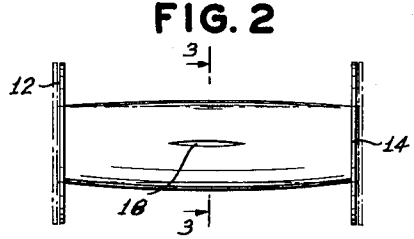
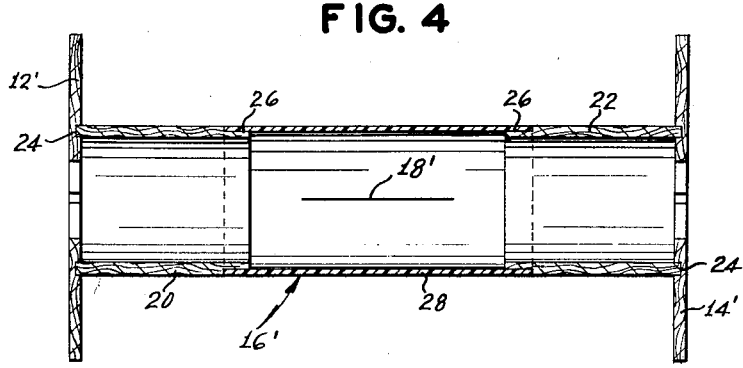
INVENTOR.
*Babette B. Newburger*
BY
ATTORNEYS

United States Patent Office 2,917,251
Patented Dec. 15, 1959

2,917,251

SPOOLS FOR PHOTOGRAPHIC FILM

Babette B. Newburger, New York, N.Y.

Application February 25, 1955, Serial No. 490,585

4 Claims. (Cl. 242—74)

This invention relates to spools and particularly to photographic film spools for use in still cameras.

The ordinary film spool now generally used is made of metal or some similar rigid material and comprises two flanges which are disposed in guide bearings in the camera and a hollow cylindrical member extending between the two flanges. The hollow cylinder is provided with two slits disposed diametrically to each other and the slits are adapted to receive the tapered leading end of a roll of film. The slits, in order to reduce slipping of the film off of the spool, are necessarily narrow and, accordingly, difficulty is often encountered when inserting the leading end of the film through the slits.

It is therefore an object of this invention to provide a film spool which is adapted to easily receive the tapered leading edge of film through its slits.

Another object of this invention is to provide a film spool having its hollow cylinder made of resilient material so that when the flanges of the spool are pressed toward one another the slits in the resilient cylinder will open relatively wide to facilitate the reception of film therein.

A further object of this invention is to provide a film spool having improved means for retaining the tapered leading end of the film in the slits in the spool.

A still further object of this invention is to provide a generally new and superior film spool.

The above and other objects, features and advantages of the present invention will be more fully understood from the following description considered in connection with the accompanying illustrative drawings.

Referring now to the drawings:

Fig. 1 is a perspective view of a film spool embodying this invention;

Fig. 2 is a side elevation view illustrating a film spool embodying this invention in both its normal and compressed conditions;

Fig. 3 is a sectional view taken along the line 3—3 of Fig. 2;

Fig. 4 is a sectional view illustrating a modified form of film spool embodying the present invention; and Fig. 5 is a sectional view illustrating a modified form of slit suitable for use in the present invention.

Referring now to the drawings in detail and particularly to Figs. 1, 2 and 3, a spool 10 is shown having flanges 12 and 14 which are connected by a hollow cylinder 16. Flange 12 is provided with the usual crossed slots 13 for reception of a conventional outwardly extending rotatable member on a camera for imparting turning movement to spool 10. This spool is preferably molded in one piece of a resilient material such as plastic, for instance polyethylene. The hub or cylinder 16 is provided with two diametrically opposed slits 18 which in their normal condition are for all intents and purposes closed. When it is desired to insert the tapered leading end of a roll of film into the slits 18 for subsequent winding of the film onto the spool 10, the user need only compress the cylinder 16 by forcing the flanges 12 and 14 toward one another as by squeezing between the thumb and forefinger. This squeezing or compressing operation will force the lips of the slits 18 away from one another so as to open the slits 18 and thereby facilitate the reception of the tapered leading end of the film therein. After the tapered leading end of the film is inserted through both said slits the flanges are released so that they can return to their normal condition as shown in dotted lines in Figs. 2 and 3 in which normal condition the slits will firmly grasp the leading end of the film and thereby insure that the film will reel onto the spool when the spool is turned in the conventional manner. From the foregoing description, it will be seen that by making cylinder 16 flexible, slits 18 are rendered openable to thereby facilitate the insertion of the end of a roll of film therethrough. Furthermore, by providing openable slits, the spacing between the lips thereof in the normal condition can be substantially less than the spacing of the lips of the slits in the rigid film spool now commonly used. By reducing the spacing, the slits themselves can be employed to actually grip the film, thus obviating the possibility of the film slipping off the spool when winding thereon is commenced, a difficulty sometimes encountered in conventional rigid spools.

Referring now to Fig. 4, the flanges 12' and 14' are shown made of a rigid material such as wood or metal and are connected by means of a three piece hub or cylinder 16' having two rigid end pieces 20 and 22 which are connected to the adjacent flanges 12' and 14', respectively, in any suitable manner such as grooved and glued joints 24. The ends of the members 20 and 22 remote from the flanges 12' and 14', respectively, are preferably of decreased diameter as at 26 and a central hollow cylindrical resilient member 28 is connected to the end members 20 and 22 by being disposed on the end members at their portions of decreased diameter 26. Member 28 is provided with a pair of diametrically opposed slits 18' which function in the same manner as slits 18 described above in connection with Figs. 1 to 3. When it is desired to receive the tapered leading end of the film through the slits 18' the flanges 12' and 14' are forced together to thereby open the slits 18', thus facilitating the reception of the tapered leading end of the film.

The slits 18 and 18' described in connection with Figs. 1 through 4 above are straight slits as would normally be produced by a sharp instrument such as a knife, blade or the like. Such straight slits are usually adequate for use as described. However, if it is desired to provide more positive gripping of the tapered leading end of the film by the lips of the resilient spool, saw-toothed or ridged slits 18" may be provided in either of the forms of the invention discussed heretofore as a substitute for the slits 18 and 18'. The ridged slits 18" have lips 30 and 32 which tend to interengage in the closed or normal condition of the slits 18" and, accordingly, the ridged lips 30 and 32 will tend to bite into the tapered leading end of the film and thus provide for a positive fastening of the film.

In addition to the forms of the invention shown and described heretofore, it will be understood that a spool similar to that shown in Figs. 1 to 3 could be made having a one-piece resilient cylinder 16 and rigid flanges 12 and 14 suitably connected at each end of the cylinder. The rigid flanges could be made of metal, wood, plastic or any other suitable material.

Furthermore, if desired, in the embodiment shown in Figs. 1–3, a reinforcing member such as a grommet having a configuration similar to slot 13 may be secured to the flange 12 to reinforce the slot. Also, with regard to the embodiment shown in Figs. 1–3 the peripheral edges of the flanges 12 and 14 may be provided with an outer metallic covering in order to reduce possible friction and wear of the flanges.

While I have shown and described several embodiments of my invention and have suggested various modifications therein, it will be understood that various changes may be made therein within the scope of the appended claims without departing from the spirit or scope of this invention.

Having thus described my invention what I claim and desire to secure by Letters Patent is:

1. A film spool comprising a pair of laterally spaced flanges interconnected by a cylindrical hub, said hub having a hollow resilient portion, and normally closed axial slit means defined in the periphery of said portion for releasably securing within said hub the end of a length of film received within said slit means, whereby said slit means can be opened by pressing said flanges together to receive or to withdraw the film, the confronting edges of said slit means grasping the film therebetween to prevent movement of said film relative to said slit means when the latter is in said normally closed position.

2. A film spool comprising a pair of laterally spaced flanges and a hollow cylindrical hub extending between said flanges and integral therewith, said hub being formed of resilient material and having a normally closed axial slit defined in the periphery thereof for releasably securing within said hub the end of film received within said slit, whereby said slit can be opened by pressing said flanges together to receive or to withdraw the film, the confronting edges of said slit means grasping the film therebetween to prevent movement of said film relative to said slit means when the latter is in said normally closed position.

3. A film spool comprising a pair of laterally spaced flanges interconnected by a cylindrical hub, said hub having a hollow resilient portion, and normally closed axial slit means defined in the periphery of said portion for releasably securing within said hub the end of a length of film received within said slit means, whereby said slit means can be opened by pressing said flanges together to receive or to withdraw the film, said flanges being formed of substantially rigid material, and said hub having a substantially rigid end piece secured between each end of said resilient portion and the adjacent flange, the confronting edges of said slit means grasping the film therebetween to prevent movement of said film relative to said slit means when the latter is in said normally closed position.

4. A film spool comprising a pair of laterally spaced flanges interconnected by a cylindrical hub, said hub having a hollow resilient portion, and normally closed axial slit means defined in the periphery of said portion for releasably securing within said hub the end of a length of film received within said slit means, whereby said slit means can be opened by pressing said flanges together to receive or to withdraw the film, the confronting edges of said slit means being adapted to grip said film therebetween to prevent movement of said film relative to said slit means, said edges being ridged for improving the gripping of the film thereby.

References Cited in the file of this patent

UNITED STATES PATENTS

| | | |
|---|---|---|
| 1,429,167 | Scharer | Sept. 12, 1922 |
| 1,840,822 | Ross | Jan. 12, 1932 |
| 2,415,914 | Silverman | Feb. 18, 1947 |
| 2,619,299 | Chappuis | Nov. 25, 1952 |
| 2,766,948 | Mundt et al. | Oct. 16, 1956 |